United States Patent
Lee et al.

(10) Patent No.: US 10,753,872 B2
(45) Date of Patent: Aug. 25, 2020

(54) APPARATUS AND METHOD FOR MEASURING FLUORESCENCE LIFETIME

(71) Applicants: INTEKPLUS CO., LTD., Daejeon (KR); OSONG MEDICAL INNOVATION FOUNDATION, Cheongju-si (KR)

(72) Inventors: Sang Yoon Lee, Daejeon (KR); Min Gu Kang, Daejeon (KR); Young Jae Won, Sejong-si (KR); Seung Rag Lee, Sejong-si (KR); Byung Jun Park, Sejong-si (KR); Byung Yeon Kim, Cheongju-si (KR)

(73) Assignees: INTEKPLUS CO., LTD., Daejeon (KR); OSONG MEDICAL INNOVATION FOUNDATION, Cheongju-si (KR)

( * ) Notice: Subject to any disclaimer, the term of this patent is extended or adjusted under 35 U.S.C. 154(b) by 0 days.

(21) Appl. No.: 16/469,675

(22) PCT Filed: Nov. 17, 2017

(86) PCT No.: PCT/KR2017/013139
§ 371 (c)(1),
(2) Date: Jun. 14, 2019

(87) PCT Pub. No.: WO2018/110843
PCT Pub. Date: Jun. 21, 2018

(65) Prior Publication Data
US 2019/0383740 A1    Dec. 19, 2019

(30) Foreign Application Priority Data

Dec. 16, 2016  (KR) .................. 10-2016-0172862

(51) Int. Cl.
*G01J 3/30* (2006.01)
*G01N 21/64* (2006.01)
(Continued)

(52) U.S. Cl.
CPC ..... *G01N 21/6408* (2013.01); *G01N 21/6458* (2013.01); *G02B 21/0076* (2013.01); *G02B 21/06* (2013.01)

(58) Field of Classification Search
CPC .......... G01N 21/6428; G01N 21/6458; G01N 21/6452; G01N 21/645; G01J 3/4406
(Continued)

(56) References Cited

U.S. PATENT DOCUMENTS 9,784,678 B2   10/2017  Ma
2002/0043651 A1*   4/2002  Darrow ............... G01N 33/582
                                                                    252/408.1
(Continued)

FOREIGN PATENT DOCUMENTS

EP    2 051 062 B1   2/2011
JP    2005-121602 A   5/2005
(Continued)

OTHER PUBLICATIONS

International Search Report dated Feb. 20, 2018 in counterpart International Patent Application No. PCT/KR2017/013139 (2 pages in English and 2 pages in Korean).
(Continued)

*Primary Examiner* — Md M Rahman
(74) *Attorney, Agent, or Firm* — NSIP Law

(57) ABSTRACT

A fluorescence lifetime measurement apparatus according to an embodiment of the present invention includes an illumination light generation unit that generates illumination light, a fluorescence photon detection unit that collects fluorescence photons generated by illuminating a sample including
(Continued)

fluorescent molecules with the illumination light, a conversion unit that converts the collected fluorescence photons into a first clock signal and converts illumination light that does not pass through the sample into a second clock signal, a first module that analyzes a fluorescence lifetime of the collected fluorescence photons from the conversion unit, a control unit that designates a range of interest (ROI) of the sample from the first module, and a second module that analyzes a fluorescence lifetime of fluorescence photons corresponding to the ROI.

5 Claims, 3 Drawing Sheets

(51) Int. Cl.
    *G02B 21/00*       (2006.01)
    *G02B 21/06*       (2006.01)

(58) Field of Classification Search
    USPC .......................................................... 356/317
    See application file for complete search history.

(56) References Cited

U.S. PATENT DOCUMENTS

| | | | | |
|---|---|---|---|---|
| 2005/0256650 A1* | 11/2005 | Labarbe | ............. | G01N 21/6408 |
| | | | | 702/19 |
| 2006/0149479 A1 | 7/2006 | Ma | | |
| 2009/0216457 A1 | 8/2009 | Ma | | |
| 2012/0080611 A1* | 4/2012 | Jones | .................... | G01J 1/0242 |
| | | | | 250/458.1 |
| 2013/0135580 A1* | 5/2013 | Hartung | ................. | A61B 3/107 |
| | | | | 351/204 |
| 2015/0011406 A1* | 1/2015 | Rich | .................... | G01N 33/582 |
| | | | | 506/9 |
| 2017/0122915 A1* | 5/2017 | Vogt | .......................... | C08K 5/11 |
| 2018/0038784 A1* | 2/2018 | Marks | ................ | G01N 15/1425 |

FOREIGN PATENT DOCUMENTS

| | | | |
|---|---|---|---|
| JP | 2005-300311 A | | 10/2005 |
| JP | 2008-527311 A | | 7/2008 |
| KR | 10-2012-0001533 A | | 1/2012 |
| KR | 20120001533 A | * | 1/2012 |
| KR | 10-2013-0123190 A | | 11/2013 |

OTHER PUBLICATIONS

Won, Youngjae, et al. "High-speed confocal fluorescence lifetime imaging microscopy (FLIM) with the analog mean delay (AMD) method." *Optics express*, vol. 19, Issue 4, 2011 (pp. 3396-3405).

O'Melia, Meghan J., et al. "FLIM data analysis of NADH and Tryptophan autofluorescence in prostate cancer cells." *Multiphoton Microscopy in the Biomedical Sciences XVI*. vol. 9712. International Society for Optics and Photonics, 2016 (pp. 1-6).

Extended European Search Report dated Nov. 8, 2019 in counterpart European Patent Application No. 17880705.3 (11 pages in English).

\* cited by examiner

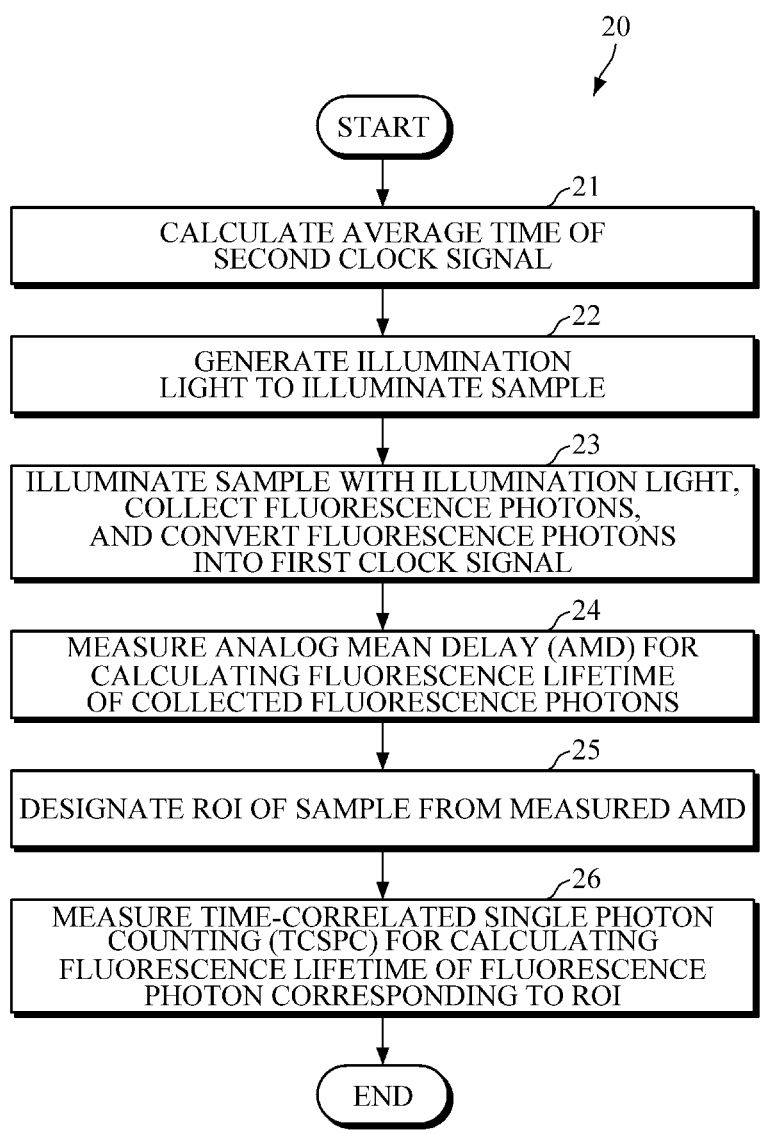

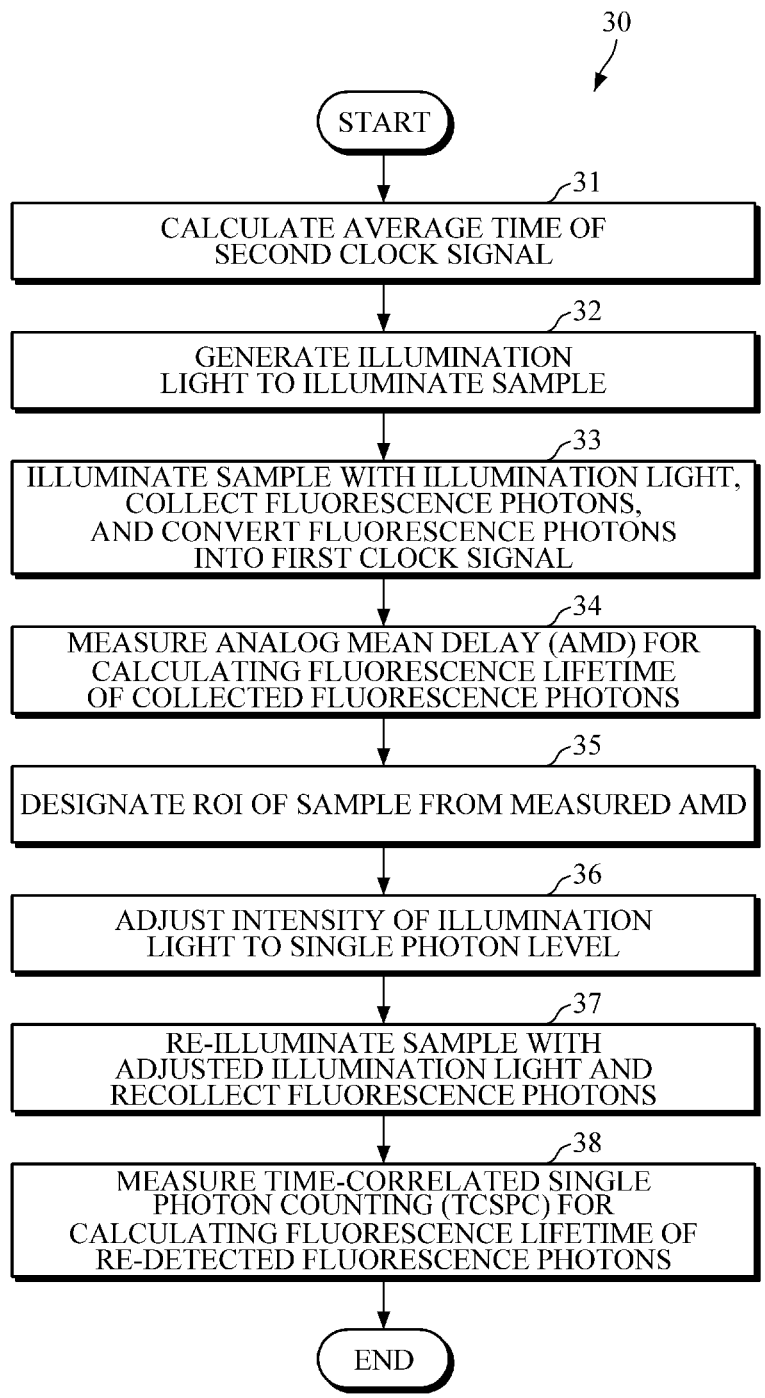

APPARATUS AND METHOD FOR MEASURING FLUORESCENCE LIFETIME

CROSS REFERENCE TO RELATED APPLICATIONS

This application is a U.S. National Stage Application of International Application No. PCT/KR2017/013139, filed on Nov. 17, 2017, which claims the benefit under 35 USC 119(a) and 365(b) of Korean Patent Application No. 10-2016-0172862, filed on Dec. 16, 2016, in the Korean Intellectual Property Office, the entire disclosure of which is incorporated herein by reference for all purposes.

TECHNICAL FIELD

The present invention relates to a fluorescence lifetime measurement apparatus and method for measuring a fluorescence lifetime, and more particularly, to a fluorescence lifetime measurement apparatus and method capable of detecting electrical, thermal, and chemical properties of a sample.

BACKGROUND ART

Microscopes are classified into first-generation optical microscopes, second-generation electron microscopes, and third-generation scanning probe microscopes and are widely used in medical science, molecular biology, new medicine development, and materials engineering.

A first-generation optical microscope (wide-field) is a microscope that uses sunlight or a halogen lamp as a light source, adjusts magnification with an aperture according to an optical lens system lens, observes a sample through a condensing lens (×15), an objective lens (×20/40/100), and a projector lens such that analysis is performed at a magnification of up to 1500, and that does not have pinhole.

A second-generation electron microscope uses an electron beam instead of a light beam of an optical microscope and uses an electron lens instead of an optical lens, enlarges and observes an object focused on a fluorescence surface of a specimen through a condenser lens, an objective lens, and a projector lens, and is classified into a scanning electron microscope, a transmission electron microscope, and a reflective electron microscope according to a purpose thereof. An electron microscope can clearly observe viruses and microorganisms that could not be analyzed by an optical microscope which has a resolution limited by the wavelength of light and a wavelength of electron beams as short as 0.05 Å. Recently, electron microscopes have been used in a wide range of fields such as medicine, biology, and engineering because they can magnify an image up to several million times to observe atomic arrangement within a crystal (at an interval of 1 Å to 2 Å).

A third-generation scanning probe microscope can measure up to one-tenth of an atom's diameter and is an advanced measuring instrument necessary for nanotechnology development. A scanning probe microscope can be used in a vacuum and can identify physical and electrical properties of a sample.

Meanwhile, recently, a fluorescence lifetime microscope has emerged as the core of research. A fluorescence lifetime microscope is an instrument (FLIM-FRET) which is capable of measuring fluorescence resonance energy transfer (FRET) most accurately. FRET is a phenomenon in which energy is transferred from one phosphor to another without the emission or absorption of light when two phosphors are located at a distance of 10 nm or less. Since phenomena that occur at a scale of several nm or less and thus cannot be seen with conventional optical microscopes can be observed with FRET, there is a growing demand in many life science fields such as cell membrane, deoxyribonucleic acid (DNA), ribonucleic acid (RNA), and protein-protein interaction fields.

DETAILED DESCRIPTION OF THE INVENTION

Technical Problem

According to an embodiment of the present invention, there are provided a fluorescence lifetime measurement apparatus and method that allows for multi-fluorescence analysis and has a fast measuring speed.

Technical Solution

A fluorescence lifetime measurement apparatus according to an embodiment of the present invention includes an emission light generation unit configured to generate emission light, a fluorescence photon detection unit configured to collect fluorescence photons generated by illuminating a sample including fluorescence molecules with the emission light, a conversion unit configured to convert the collected fluorescence photons into a first clock signal and convert emission light that does not pass through the sample into a second clock signal, a first module configured to analyze a fluorescence lifetime of the collected fluorescence photons from the conversion unit, a control unit configured to designate a range of interest (ROI) of the sample from the first module, and a second module configured to analyze a fluorescence lifetime of a fluorescence photon corresponding to the ROI.

The first module may include an analog mean delay (AMD) measurement unit configured to compute the fluorescence lifetime using a difference between an average time of the first clock signal and an average time of the second clock signal.

The second module may include a time-correlated single photon counting (TCSPC) measurement unit configured to accumulate temporal data of one of the fluorescence photons to compute the fluorescence lifetime.

A fluorescence lifetime measurement method according to an embodiment of the present invention may include a light generation step in which illumination light is generated, a first illumination step in which a sample is illuminated with the illumination light, an analog mean delay (AMD) measurement step in which a fluorescence lifetime of the fluorescence photons collected by a fluorescence photon detection unit is computed, a control step in which a range of interest (ROI) of the sample is designated from a result of the AMD measurement step, and a time-correlated single photon counting (TCSPC) measurement step in which a fluorescence lifetime of fluorescence photons corresponding to the ROI is computed.

The fluorescence lifetime measurement method may further include, after the control step, an adjustment step in which an intensity of the illumination light is lowered to a single photon level and a second illumination step in which fluorescence photons generated by re-illuminating the ROI with the adjusted illumination light are recollected, wherein the TCSPC measurement step may include computing a fluorescence lifetime of the fluorescence photons detected in the second illumination step.

Advantageous Effects of the Invention

According to an embodiment of the present invention, it is possible to compute a fluorescence lifetime of a sample more quickly.

DESCRIPTION OF THE DRAWINGS

FIG. 2 is a flowchart of a fluorescence lifetime measurement method according to an embodiment of the present invention.

FIG. 3 is a flowchart of a fluorescence lifetime measurement method according to another embodiment of the present invention.

MODE OF THE INVENTION

Figure 1:
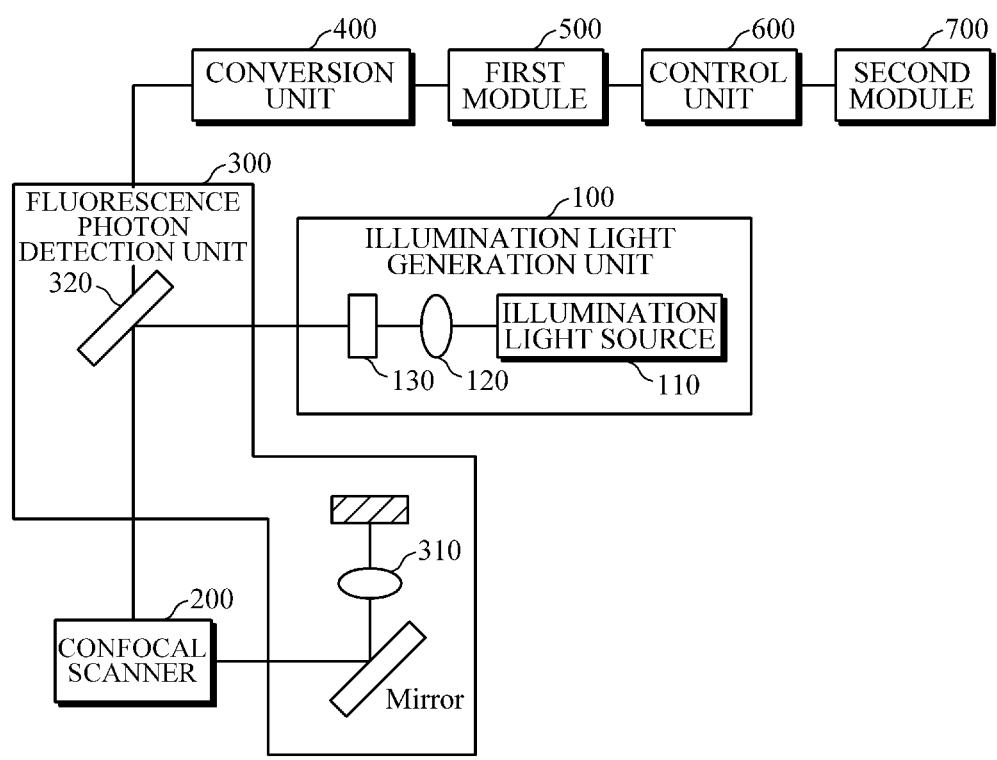
FIG. 1 is a block diagram of a fluorescence lifetime measurement apparatus according to an embodiment of the present invention.

Advantages and features of the present disclosure and methods of accomplishing the same will be apparent by referring to embodiments described below in detail in connection with the accompanying drawings. The present disclosure may, however, be embodied in different forms and should not be construed as limited to the embodiments set forth herein. Rather, these embodiments are provided so that this disclosure will be thorough and complete and will fully convey the scope of the present invention to those skilled in the art. Therefore, the scope of the disclosure is defined only by the appended claims.

Unless otherwise defined, all terms (including technical and scientific terms) used herein have the same meaning as commonly understood by one of ordinary skill in the art to which this invention belongs. Also, terms such as those defined in commonly-used dictionaries are not to be interpreted in an idealized or overly formal sense unless expressly so defined herein.

Hereinafter, a fluorescence lifetime measurement apparatus 10 according to an embodiment of the present invention will be described with reference to the accompanying drawings.

FIG. 1 is a block diagram of the fluorescence lifetime measurement apparatus 10 according to an embodiment of the present invention. Referring to FIG. 1, an illumination light generation unit 100 generates illumination light capable of exciting a sample S. The illumination light is incident in a spatial parallel manner through a collimator 120 in the form of pulses with respect to time.

The incident illumination light passes through a short pass filter (SPF) 130 and then is reflected from a dichroic filter 320 and incident on the sample S through an objective lens 310. The incident illumination light generates fluorescence photons from the sample S.

The generated fluorescence photons are collected by a confocal scanner 200 through the objective lens 310 and then pass through the dichroic filter 320.

Accordingly, when the illumination light is removed, the fluorescence photons pass through a low pass filter (LPF) and then are focused through the collimator 120 and incident on a conversion unit 400.

Next, the fluorescence photons are transformed into a first clock signal by the conversion unit 400, and the first clock signal is amplified by a digitizer. The amplified first clock signal is delivered to a first module 500.

The first module 500 computes a fluorescence lifetime of the fluorescence photons on the basis of the first clock signal. The fluorescence lifetime computed by the first module 500 is delivered to a control unit 600, and the control unit 600 designates a range of interest (ROI) of the sample S from the fluorescence lifetime calculated by the first module.

Next, a second module 700 individually analyzes fluorescence photons corresponding to the ROI and then computes a fluorescence lifetime.

The illumination light generation unit 100 has a structure configured to generate illumination light to illuminate a sample S including fluorescent molecules and includes an illumination light source 110.

The illumination light has a pulse width of 100 psec or less and a wavelength ranging from 300 nm to 700 nm. The illumination light source 110 according to an embodiment of the present invention includes a semiconductor laser.

Also, the semiconductor laser may include an electric pulse signal generator having a pulse width of 300 ps or less, a pulse clock unit configured to generate a stable trigger signal, and a semiconductor pulse laser head having a wavelength of 400 nm.

The illumination light generation unit 100 may further include the SPF 130 and the collimator 120 for collecting the illumination light.

The confocal scanner 200 allows for three-dimensional (3D) imaging and thus may measure a change in the sample S corresponding to time or wavelengths of the light in a 3D manner.

The confocal scanner 200 according to an embodiment of the present invention includes a horizontal scanning unit and a vertical scanning unit. The horizontal scanning unit may include a galvanometer mirror and may perform two-dimensional (2D) scanning at a very high speed using the galvanometer mirror. The vertical scanning unit includes motor-driven means or piezoelectric-driven means (PZT). The motor-driven means or piezoelectric-driven means may all be adjusted by an open-loop system or a closed-loop system.

The fluorescence photon detection unit 300 is a module that collects a plurality of fluorescence photons generated by illuminating the sample S. The fluorescence photon detection unit 300 may include a fluorescence photon collection lens 310 and the dichroic filter 320 for preventing the conversion unit 400, which will be described below, from receiving the illumination light.

The fluorescence photon collection lens 310 is a lens that collects a large number of fluorescence photons generated from the sample S. The fluorescence photon collection lens 310 may serve as the objective lens 310.

The dichroic filter 320 is an optical filter that selectively passes the incident illumination light depending on wavelength. The dichroic filter 320 according to an embodiment of the present invention has a characteristic of reflecting a wavelength band corresponding to the illumination light and passing a wavelength band corresponding to the fluorescence photons. However, the passed wavelength band or the reflected wavelength band of the dichroic filter 320 may be adjusted as necessary.

The conversion unit 400 is a module that amplifies and converts the fluorescence photons having passed through the dichroic filter 320 into a clock signal. The conversion unit 400 includes a photodetector, an amplifier, and a digitizer.

The photodetector and amplifier according to an embodiment of the present invention may include a photo multiply tube (PMT), an avalanche photodiode (APD) and/or LPF, and an amp.

The photodetector converts the collected fluorescence photons into the first clock signal, synchronizes a clock signal with the illumination light source 110, and then converts the clock signal into a second clock signal. The second clock signal is a signal that is computed based on the clock signal synchronized with the illumination light source 110 and that is obtained by converting light that is emitted from the illumination light source 110 without passing through the sample S. The clock signal is delivered to the LPF.

The LPF is a filter that passes low frequencies and temporally amplifies the clock signal. The LPF according to an embodiment of the present invention includes an electronic Gaussian low-pass filter (GLPF).

The GLPF removes high-frequency parts to facilitate data processing for the clock signal. GLPF is symmetrically implemented such that there is no ringing. The GLPF decreases the bandwidth of the clock signal to correspond to the bandwidth of the digitizer.

The digitizer performs high-frequency sampling for signal recovery in consideration of illumination light having a small pulse width. Specifically, the digitizer functions as a portion of an AMD measurement unit that collects clock signals and computes a fluorescence lifetime on the basis of the collected clock signals.

The first module 500 is a module for finding the fluorescence lifetime of the collected fluorescence photons and includes a signal collection unit and the AMD measurement unit.

The signal collection unit collects the first clock signal obtained through conversion by the conversion unit 400 and collects the second clock signal synchronized with the illumination light source 110.

The signal collection unit according to an embodiment of the present invention may include an electronic data acquisition (DAQ) board, and the DAQ board may include a first channel for collecting the first clock signal and a second channel for collecting the second clock signal.

The AMD measurement unit computes the fluorescence lifetime using a difference between the average time of the first clock signal and the average time of the second clock signal. The computation is expressed as in Equation 1 below:

$$\tau = \langle T_e \rangle - \langle T_e^0 \rangle \equiv \left( \frac{\int t \cdot i_e(t)dt}{\int i_e(t)dt} \right) - \left( \frac{\int t \cdot i_{irf}(t)dt}{\int i_{irf}(t)dt} \right). \quad \text{[Equation 1]}$$

Here, $i_e(t)$ is a measured temporal fluorescence photon signal and $i_{irf}(t)$ is an impulse response function (IRF) of a measurement system. $\langle T_e \rangle$ and $\langle T_e^0 \rangle$ are defined as an average delay of the fluorescence photon signal and an average delay of the IRF. In order to extract an absolute fluorescence lifetime of the fluorescence photons using the AMD method, initial time points (or points where t=0) of the time functions $i_e(t)$ and $i_{irf}(i)$ in Equation 1 should be accurately defined and perfectly matched. In the experiment, $i_e(t)$ and $i_{irf}(t)$ are measured by the electronic DAQ board, and the zero-points of the functions may be acquired by a trigger signal from the illumination light source 110. The AMD measurement unit has a high measuring speed and high lifetime accuracy. Also, since an image is configured based on spatial distribution of the measured fluorescence lifetime, it is possible to greatly reduce the time required for designating the ROI of the sample S.

The control unit 600 receives the fluorescence lifetime of the sample S from the first module 500, compares a fluorescence lifetime corresponding to each region obtained by dividing a target with a reference value, and extracts an ROI and fluorescence photons included in the ROI. The reference value may be designated in advance and changed by a user. Also, the ROI may include at least one region. Also, the ROI is one region specified by one closed curve. Meanwhile, the remaining part other than a part unnecessary to measure the fluorescence lifetime may be the ROI.

The ROI is designated, and fluorescence photon information corresponding to the ROI is delivered to the second module 700. The second module 700 measures the fluorescence lifetime for only fluorescence photons corresponding to the ROI. Here, the second module 700 is a module for analyzing the fluorescence lifetime of the fluorescence photons corresponding to ROI and includes a time-correlated single photon counting (TCSPC) measurement unit.

Accordingly, when the fluorescence lifetime is measured later, the fluorescence lifetime is measured only for the fluorescence photons corresponding to the ROI instead of being measured for the entire sample S. Thus, it is possible to shorten the time required for fluorescence analysis.

In detail, the TCSPC measurement unit obtains the fluorescence lifetime by creating a frequency distribution table, and thus at least 100 photons should be measured to obtain the fluorescence life time of a single photon. Accordingly, the time for ultimately determining the fluorescence lifetime for a single fluorescence photon is 10 microseconds or more. Generally, a microscope image consists of more than one million pixels, so it takes more than ten seconds to acquire the entirety of a single FLIM image.

Moreover, it will take more time when a 3D image is desired to be acquired. For example, when 100 2D images are acquired and one 3D image is desired to be acquired, the measurement time is more than 15 minutes, which is a great deal of time.

On the contrary, it is enough for the TCSPC measurement unit according to an embodiment of the present invention to measure only the sample S corresponding to the ROI designated by the control unit 600, and thus the measurement time is significantly less than the time required to obtain the 3D image for the entire sample S.

Meanwhile, in order for the second module 700 to analyze the fluorescence lifetime of the fluorescence photons, the control unit 600 may adjust the illumination light. For example, the control unit 600 adjusts a time interval between illumination light pulses to be longer than the fluorescence lifetime of the fluorescence photons. When the time interval between the illumination light pulses is similar to the fluorescence lifetime, the waveforms of two adjacent fluorescent photons overlap each other with respect to time such that accurate values cannot be obtained. Accordingly, in order for the second module 700 to perform accurate analysis, the control unit 600 may adjust the pulse period of the illumination light to five times or more the fluorescence lifetime τ, and the intensity of the illumination light may be adjusted.

The TCSPC measurement unit computes time difference data between the first clock signal and the second clock signal through a high photon detection rate of tens of MHz with respect to a single photon, accumulates the time difference data, and calculates the fluorescence lifetime. The arrival time of a single photon can be precisely measured, regardless of how long the width of the shape of the response pulse caused by the single photon is along the time axis. When only a single photon is sensed, the arrival time of the single photon may be measured by detecting the arrival time of a rising edge of a measured single photon response.

Meanwhile, a fluorescence waveform obtained when a large number of fluorescence photons are collected becomes the same as the probability distribution function of fluorescence having an exponential decay shape. In this case, when illumination is made with illumination light having a very short pulse width at t=0, a fluorescence photon density $I_F(t)$ generated due to the illumination is computed using Equation 2 below:

$$I_F(t)=I_0 e^{-t/\tau} u(t)$$ [Equation 2]

Here, $I_0$ is an initial value, $\tau$ is a fluorescence lifetime, and a function u(t) is indicated as zero when t<0 and one when t≥0. That is, the fluorescence lifetime means that the time it takes for the emission probability of the fluorescence photons to decrease by 1/e compared to the initial value. The fluorescence lifetimes of most fluorescence materials utilized in microscopy applications range from 0.1 ns to 5 ns.

The configuration of the fluorescence lifetime measurement apparatus 10 according to an embodiment of the present invention has been described so far. A fluorescence lifetime measurement method 20 according to an embodiment of the present invention will be described below. The fluorescence lifetime measurement method consists of steps processed by the fluorescence lifetime measurement apparatus 10 shown in FIG. 1. Therefore, content overlapping with that described above will be omitted, and the omitted content may also be applied to the fluorescence lifetime measurement method 20 according to an embodiment of the present invention.

FIG. 2 is a flowchart of the fluorescence lifetime measurement method 20 according to an embodiment of the present invention.

Referring to FIG. 2, step 21 is a second-clock signal measurement step in which illumination light is generated using the fluorescence lifetime measurement apparatus 10 and an average time of a second clock signal is measured for illumination light that does not pass through a sample S.

Step 22 is a light generation step in which the sample S including fluorescent molecules is prepared for the fluorescence lifetime measurement apparatus 10 and the illumination light is generated to illuminate the sample S.

Step 23 is a first illumination step in which the sample S is illuminated with the illumination light. In this case, fluorescence photons generated from the sample S are detected through the fluorescence photon collection unit. Also, the collected fluorescence photons are amplified and then converted into a first clock signal.

Step 24 is an analog mean delay (AMD) measurement step in which a fluorescence lifetime is computed using a difference between an average time of the first clock signal and an average time of the second clock signal through the first module 500 (AMD). In this case, the fluorescence lifetime may be measured for a certain range of the sample S through simple computation in a very short time.

Step 25 is a control step in which the control unit 600 designates an ROI of the sample S from the result of the first module 500 (AMD). As an example, the designation of the ROI may be determined from the result of the first module 500.

As another example, the designation of the ROI may be determined through a comparison between the result of the first module 500 and a pre-stored reference value. The ROI may be one region specified by one closed curve or may be the remaining part other than one closed curve.

As described above, the designated ROI is to be measured by the second module 700 (time-correlated single photon counting; TCSPC). On the other hand, the remaining region of the sample other than the ROI is not to be measured by the second module 700. Accordingly, it is possible to reduce the required measurement time by the measurement time of the remaining region of the sample S other than the ROI.

Step 26 is a TCSPC measurement step in which a frequency distribution table is created through the second module (TCSPC) by counting a single photon hundreds to thousands of times and then a fluorescence lifetime of fluorescence photons corresponding to the ROI is measured.

The fluorescence lifetime measurement method 30 according to another embodiment of the present invention will be described below. The fluorescence lifetime measurement method 30 according to another embodiment of the present invention consists of steps processed by the fluorescence lifetime measurement apparatus 10 shown in FIG. 1. Accordingly, the content overlapping with those described above will be omitted, and the omitted content may also be applied to the fluorescence lifetime measurement method 30 according to another embodiment of the present invention.

FIG. 3 is a flowchart of the fluorescence lifetime measurement method 30 according to another embodiment of the present invention.

Referring to FIG. 3, step 31 is a second-clock signal measurement step in which illumination light is generated using the fluorescence lifetime measurement apparatus 10 and an average time of a second clock signal is measured for illumination light that does not pass through a sample S.

Step 32 is a light generation step in which the sample S including fluorescent molecules is prepared for the fluorescence lifetime measurement apparatus 10 and the illumination light is generated to illuminate the sample S.

Step 33 is a first illumination step in which the sample S is illuminated with the illumination light. In this case, fluorescence photons generated from the sample S are collected through the fluorescence photon collection unit. Also, the collected fluorescence photons are amplified and then converted into a first clock signal.

Step 34 is an analog mean delay (AMD) measurement step in which a fluorescence lifetime is computed using a difference between an average time of the first clock signal and an average time of the second clock signal through the first module 500 (AMD). In this case, the fluorescence lifetime may be measured for a certain range of the sample S through simple computation in a very short time.

Step 35 is a control step in which the control unit 600 designates a range of interest (ROI) of the sample S from the result of the first module 500 (AMD). As an example, the designation of the ROI may be determined from the result of the first module 500. As another example, the designation of the ROI may be determined through a comparison between the result of the first module 500 and a pre-stored reference value. The ROI may be one region specified by one closed curve or may be the remaining part other than one closed curve.

Step 36 is an adjustment step in which the control unit 600 adjusts and decreases the intensity of the illumination light to a single photon level. In this case, when the fluorescence lifetime is measured through the second module 700, a histogram may be drawn by measuring one photon per each pulse.

Step 37 is a second illumination step in which the ROI is re-illuminated with the illumination light having the adjusted light intensity. Fluorescence photons are generated from the re-illuminated sample S again, and the generated fluorescence photons are recollected.

Step 38 is a TCSPC measurement step in which a frequency distribution table is re-created through the second module (TCSPC) by counting a single photon hundreds to thousands of times and then a fluorescence lifetime of fluorescence photons corresponding to the ROI is measured.

The invention claimed is:

1. A fluorescence lifetime measurement apparatus comprising:
   an illumination light generator configured to generate illumination light;
   a fluorescence photon detector configured to collect fluorescence photons generated by illuminating a sample including fluorescent molecules with the illumination light;
   a convertor configured to convert the collected fluorescence photons into a first clock signal and to convert illumination light that does not pass through the sample into a second clock signal;
   a first processor configured to analyze a fluorescence lifetime of the collected fluorescence photons from the convertor;
   a controller configured to designate a range of interest (ROI) of the sample from the first processor; and
   a second processor configured to analyze a fluorescence lifetime of fluorescence photons corresponding to the ROI.

2. The fluorescence lifetime measurement apparatus of claim 1, wherein the first processor comprises an analog mean delay (AMD) measurer configured to compute the fluorescence lifetime using a difference between an average time of the first clock signal and an average time of the second clock signal.

3. The fluorescence lifetime measurement apparatus of claim 1, wherein the second processor comprises a time-correlated single photon counting (TCSPC) measurer configured to accumulate temporal data of one of the fluorescence photons to compute the fluorescence lifetime.

4. A fluorescence lifetime measurement method comprising:
   generating an illumination light;
   illuminating a sample with the illumination light;
   computing an analog mean delay (AMD) measurement based on a fluorescence lifetime of fluorescence photons collected from the illuminated sample;
   designating a range of interest (ROI) of the sample from a result of the computing of the AMD measurement; and
   computing a time-correlated single photon counting (TCSPC) measurement in which a fluorescence lifetime of fluorescence photons corresponds to the ROI.

5. The fluorescence lifetime measurement method of claim 4, further comprising, after the designating of the ROI of the sample:
   lowering an intensity of the illumination light to a single photon level; and
   recollecting fluorescence photons generated by re-illuminating the ROI with the adjusted illumination light,
   wherein the computing of the TCSPC measurement comprises computing a fluorescence lifetime of the fluorescence photons detected in the recollecting of the fluorescence photons.

* * * * *